(12) United States Patent
Jerwick et al.

(10) Patent No.: US 9,157,347 B2
(45) Date of Patent: Oct. 13, 2015

(54) INTERNAL COMBUSTION ENGINE INCLUDING CRANKSHAFT THAT IS ROTATED WHILE ENGINE IS IN A NON-FUELED MODE AND METHOD OF OPERATING AN ENGINE

(75) Inventors: John Jerwick, Hagerstown, MD (US); John Bartel, Williamsport, MD (US)

(73) Assignee: Mack Trucks, Inc., Greensboro, NC (US)

( * ) Notice: Subject to any disclaimer, the term of this patent is extended or adjusted under 35 U.S.C. 154(b) by 213 days.

(21) Appl. No.: 13/819,328

(22) PCT Filed: Oct. 20, 2010

(86) PCT No.: PCT/US2010/053329
§ 371 (c)(1),
(2), (4) Date: Feb. 26, 2013

(87) PCT Pub. No.: WO2012/054025
PCT Pub. Date: Apr. 26, 2012

(65) Prior Publication Data
US 2013/0158835 A1   Jun. 20, 2013

(51) Int. Cl.
*F01M 5/02* (2006.01)
*B60K 6/485* (2007.10)
*B60K 6/48* (2007.10)
(Continued)

(52) U.S. Cl.
CPC ............. *F01M 5/025* (2013.01); *B60K 6/48* (2013.01); *B60K 6/485* (2013.01); *B60W 10/06* (2013.01); *B60W 10/08* (2013.01); *B60W 20/108* (2013.01); *F01M 9/12* (2013.01); *F02D 28/00* (2013.01); *B60K 2025/005* (2013.01); *B60W 20/00* (2013.01); *F01M 1/20* (2013.01);

*F01M 2001/0215* (2013.01); *F01M 2005/026* (2013.01); *F02N 11/04* (2013.01);
(Continued)

(58) Field of Classification Search
CPC .. B60W 20/00; F01M 5/025; F01M 2005/026
USPC ............... 701/102; 123/179.3, 179.4, 179.16, 123/196 R, 196 A; 184/6.5
See application file for complete search history.

(56) References Cited

U.S. PATENT DOCUMENTS 2,679,438 A * 5/1954 Love .............................. 384/286
5,195,476 A * 3/1993 Schwarz ..................... 123/179.5
(Continued)

FOREIGN PATENT DOCUMENTS

JP   H10067238   3/1998
WO   9303275 A1   2/1993

OTHER PUBLICATIONS

International Search Report (Dec. 13, 2010) for corresponding International Application PCT/US2010/053329.
(Continued)

*Primary Examiner* — Mahmoud Gimie
(74) *Attorney, Agent, or Firm* — WRB-IP LLP

(57) ABSTRACT

A method of operating an engine includes starting and stopping operation of an internal combustion engine that includes a crankshaft having a bearing journal and a bearing in which the bearing journal is rotatable. The crankshaft is constantly turned when the internal combustion engine is in the non-fueled mode. An oil pump can be driven to lubricate the bearing journal and the bearing while the internal combustion engine is in the non-fueled mode to provide hydrodynamic lubrication. An engine is also disclosed.

15 Claims, 2 Drawing Sheets

(51) Int. Cl.
*B60W 10/06* (2006.01)
*B60W 10/08* (2006.01)
*F01M 9/12* (2006.01)
*F02D 28/00* (2006.01)
*B60W 20/00* (2006.01)
*B60K 25/00* (2006.01)
*F01M 1/20* (2006.01)
*F02N 11/04* (2006.01)
*F02N 11/08* (2006.01)
*F01M 1/02* (2006.01)

(52) U.S. Cl.
CPC ............. *F02N 11/08* (2013.01); *Y02T 10/6221* (2013.01); *Y02T 10/6226* (2013.01); *Y02T 10/6286* (2013.01)

(56) References Cited

U.S. PATENT DOCUMENTS

| | | | |
|---|---|---|---|
| 5,495,833 A | | 3/1996 | Ishizaka et al. |
| 5,743,231 A | * | 4/1998 | Reinosa ..................... 123/196 S |
| 5,884,601 A | * | 3/1999 | Robinson ................... 123/196 S |
| 6,349,692 B1 | * | 2/2002 | Reinosa ..................... 123/196 S |
| 6,453,864 B1 | | 9/2002 | Downs et al. |
| 6,655,342 B1 | * | 12/2003 | Wendels et al. ........... 123/196 R |
| 7,516,807 B2 | * | 4/2009 | Carlson ......................... 180/165 |
| 2001/0018903 A1 | | 9/2001 | Hirose et al. |
| 2004/0108149 A1 | | 6/2004 | Adachi et al. |
| 2010/0229824 A1 | * | 9/2010 | Matsuo et al. ............ 123/196 R |
| 2010/0243348 A1 | | 9/2010 | Nomura et al. |
| 2010/0288570 A1 | * | 11/2010 | Tarnowsky et al. ...... 180/65.265 |
| 2010/0299045 A1 | * | 11/2010 | Moriya et al. ................. 701/102 |
| 2010/0320019 A1 | * | 12/2010 | Gale et al. .................. 180/65.27 |
| 2010/0321030 A1 | * | 12/2010 | Gale et al. ..................... 324/537 |

OTHER PUBLICATIONS

International Preliminary Report on Patentabilay (Dec. 14, 2012) for corresponding International Application PCT/US2010/053329.

Translation of official action dated May 16, 2014 for corresponding Japan application No. 2013-534866.

Translation of official action dated Jun. 1, 2015 for corresponding China application No. 201080069729.4.

* cited by examiner

INTERNAL COMBUSTION ENGINE INCLUDING CRANKSHAFT THAT IS ROTATED WHILE ENGINE IS IN A NON-FUELED MODE AND METHOD OF OPERATING AN ENGINE

BACKGROUND AND SUMMARY

The present invention relates to internal combustion engines and more particularly to crankshafts associated with such engines.

Repeated starting and stopping of an internal combustion engine results in substantial wear of crankshaft journals and journal bearings because the engine is not properly lubricated when rotation of the crankshaft starts. Journal bearings are ordinarily designed for full hydrodynamic lubrication. In other words, the crankshaft journal and the crankshaft journal bearings usually never make contact when the engine is running because there is a hydrodynamic oil film between them that prevents metal to metal contact. However, hydrodynamic lubrication requires oil pressure and shaft rotation. Oil pressure alone does not produce hydrodynamic lubrication but only boundary lubrication. In boundary lubrication there may be metal to metal contact and wear will occur. The inventors have recognized that, to provide hydrodynamic lubrication of a crankshaft journal and bearing arrangement, there must be both oil pressure and rotation of the crankshaft.

According to an aspect of the present invention, a method of operating an engine comprises switching the engine between being fueled and in a non-fueled mode, the internal combustion engine comprising a crankshaft having a bearing journal and a bearing in which the bearing journal is rotatable, and constantly turning the crankshaft when the internal combustion engine is in the non-fueled mode.

According to another aspect of the present invention, an engine comprises an internal combustion engine comprising a crankshaft having a bearing journal and a bearing in which the bearing journal is rotatable, and means for constantly turning the crankshaft when the internal combustion engine is in a non-fueled mode.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
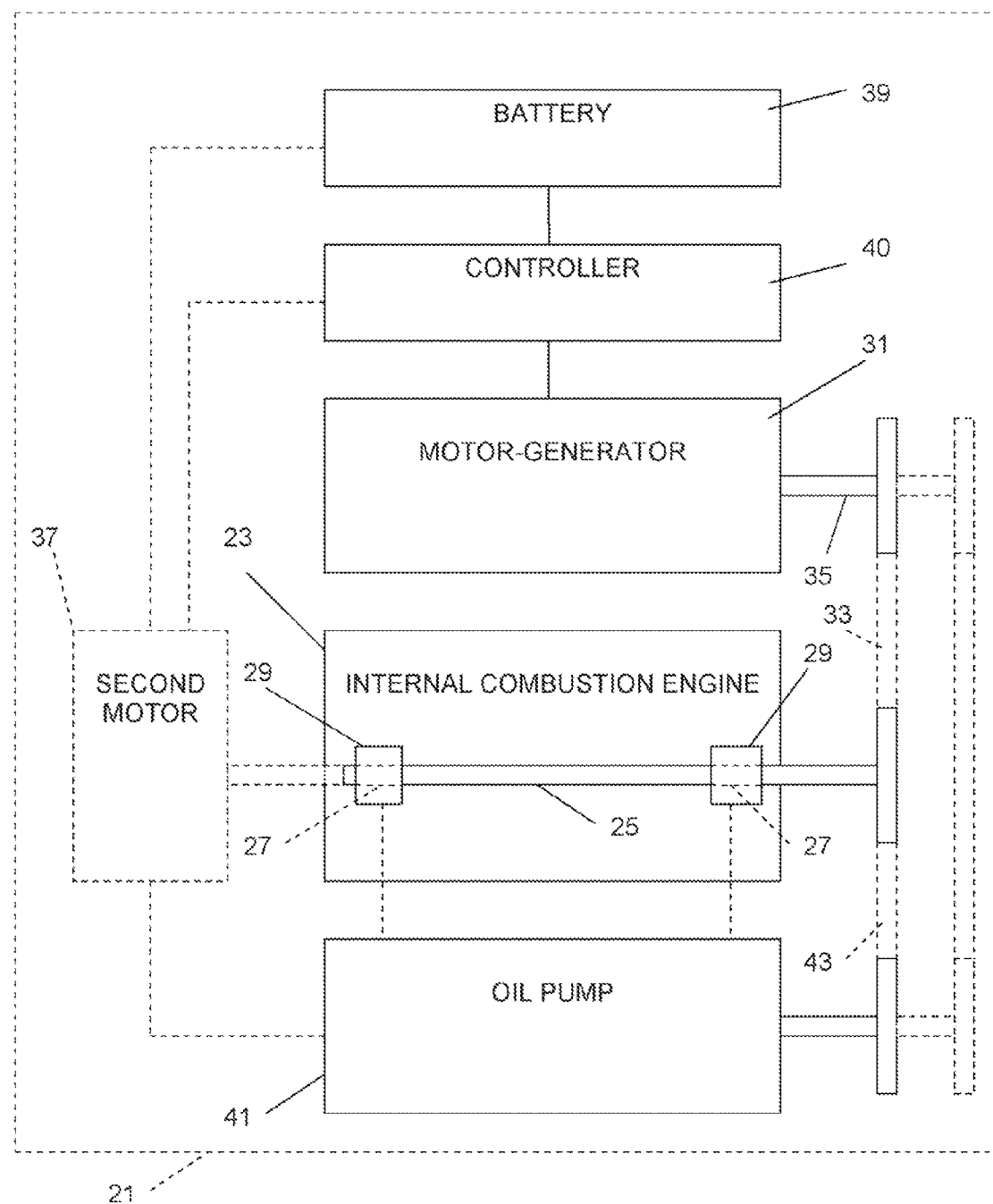
FIG. 1 is a schematic view of a hybrid powertrain according to an aspect of the present invention.

A powertrain 21 according to an aspect of the present invention is shown in FIG. 1. The powertrain 21 includes an internal combustion engine 23 and comprises a crankshaft 25 having a bearing journal 27 and a bearing 29 in which the bearing journal is rotatable. An arrangement is provided for constantly turning the crankshaft 25 when the internal combustion engine 23 is in a non-fueled mode. For purposes of the present application, a "non-fueled mode" includes conditions when the internal combustion engine does not drive the crankshaft, usually when the internal combustion engine is not fueled, but not necessarily exclusively. The arrangement will ordinarily turn the crankshaft 25 through a complete rotation, however, the crankshaft can, alternatively, be turned through less than 360° and merely pivot or rock back and forth which, all of which motions shall, for purposes of the present application, be referred to generically as turning, except where otherwise indicated.

Figure 2:
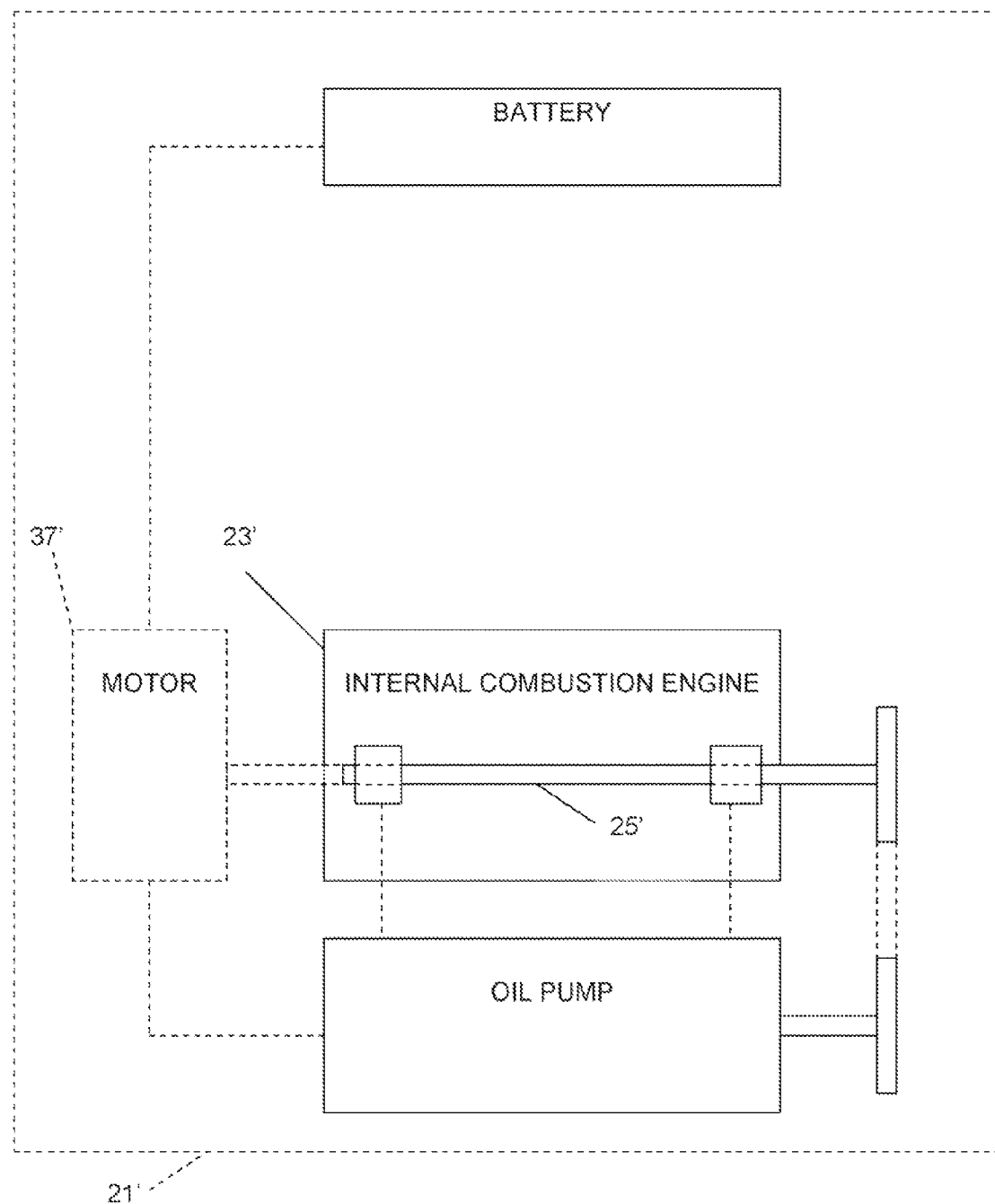
FIG. 2 is a schematic view of another engine according to an aspect of the present invention.

According to an aspect of the present invention, the powertrain 21 is a hybrid powertrain that also comprises an electric motor 31, which is preferably a motor-generator. The electric motor 31 can be used to turn the crankshaft 25 when the internal combustion engine 23 is in the non-fueled mode. A mechanical connection 33 (shown in phantom) to the crankshaft 25 can be provided, such as a belt or gears between a driven shaft 35 of the electric motor 31 and the crankshaft. Alternatively, another arrangement can be provided for turning the crankshaft 25, such as, in a hybrid powertrain, a second electric motor 37 (shown in phantom) powered by a power source such as a battery 39. The battery 39 can store energy from the motor-generator 31 and a controller 40 can be provided for controlling operation of the second motor 37 and/or the motor-generator.

Where the powertrain 21' is not a hybrid powertrain, as seen in FIG. 2, the crankshaft 25' can be turned by any suitable means, such as an electric motor 37' or a mechanical arrangement such as a spring that absorbs kinetic energy from stopping of a vehicle and releases it in a controlled manner to turn the crankshaft when the internal combustion engine 23' is in the non-fueled mode. Of course, any suitable means, not necessarily limited to the motor 31 or the motor 37, can be used for turning the crankshaft 25 in the powertrain 21 of FIG. 1, as well.

Referring to FIG. 1, in addition to turning the crankshaft 25, it is desirable to maintain hydrodynamic lubrication between the bearing journal 27 and the bearing 29 so that there is no metal to metal contact and a film of lubricant such as oil remains between the journal and the bearing. Hydrodynamic lubrication is achieved by constantly turning the crankshaft 25 and providing lubricant such as oil under pressure to the bearing 29 and journal 27. Ordinarily, the oil pump 41 of the internal combustion engine 23 is arranged to provide oil under pressure to the bearing journal 27 and the bearing 29 at all times. Accordingly, an arrangement is provided for driving the oil pump 41 while the internal combustion engine 23 is in the non-fueled mode. The arrangement may comprise, as shown in FIG. 1, a mechanical connection 43 (shown in phantom), such as a belt or gears, between the oil pump 41 and the crankshaft 25 such that turning of the crankshaft drives the oil pump. Alternatively, the oil pump 41 can be driven by an electrical drive such as by the electric motor 31 component of a hybrid powertrain, or a second electric motor 37, or by any other suitable electrical or non-electrical means.

In a method of operating an powertrain 21 according to an aspect of the present invention, the internal combustion engine 23 is periodically switched between being fueled and in a non-fueled mode, such as when it is desired to operate the electric motor 31 of a hybrid powertrain. The internal combustion engine 23 comprises the crankshaft 25 having the bearing journal 27 and the bearing 29 in which the bearing journal is rotatable. The crankshaft 25 is constantly turned, i.e., either by being pivoted or rocked back and forth or by being turned through 360°, when the internal combustion engine is in the non-fueled mode.

The oil pump 41 is driven to lubricate the bearing journal 27 and the bearing 29 while the internal combustion engine 23 is in the non-fueled mode. Ordinarily, the crankshaft 25 is turned while driving the oil pump 41 so as to maintain hydrodynamic lubrication between the bearing journal 27 and the bearing 29.

The crankshaft 25 can be turned and the oil pump 41 driven by any suitable means. For example, one or both of the crankshaft 25 and the oil pump 41 may be driven by the motor 31 of a hybrid powertrain 21, by a second motor 37 provided in addition to the hybrid powertrain motor, by an electric motor that is not part of a hybrid powertrain, by any other suitable driving means such as springs, compressed gas, and the like. When used in vehicles, the means for driving the crankshaft will preferably be means that stores energy when the vehicle slows down, such as the motor-generator 31 of a hybrid powertrain. The oil pump 41 may, alternatively, be driven by means of a mechanical connection between the crankshaft 25 and the oil pump 41 when the crankshaft is driven by, for example, the motor-generator 31 or the motor 37.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method of operating a hybrid powertrain, the hybrid powertrain comprising an internal combustion engine and an alternate drive, the alternate drive comprising a motor-generator, comprising:
    switching the internal combustion engine from a fueled mode to a non-fueled mode and back to a fueled mode, the internal combustion engine comprising a crankshaft having a bearing journal and a bearing in which the bearing journal is turnable;
    turning the crankshaft via the internal combustion engine only when the internal combustion engine operates in the fueled mode;
    operating the alternative drive when the internal combustion engine is in the non-fueled mode; and
    constantly turning the crankshaft via the alternate drive when the alternate drive is operated during an entire time that the internal combustion engine is in the non-fueled mode via a mechanical connection to the motor-generator of the hybrid powertrain.

2. The method as set forth in claim 1, comprising turning the crankshaft through less than 360° when the internal combustion engine is in the non-fueled mode.

3. The method as set forth in claim 1, comprising turning the crankshaft constantly when the internal combustion engine is in the non-fueled mode.

4. The method as set forth in claim 1, comprising driving an oil pump to lubricate the bearing journal and the bearing while the internal combustion engine is in the non-fueled mode.

5. The method as set forth in claim 4, wherein the oil pump is mechanically connected to the crankshaft so that rotation of the crankshaft drives the oil pump.

6. The method as set forth in claim 4, wherein the oil pump is electrically driven.

7. The method as set forth in claim 4, comprising turning the crankshaft while driving the oil pump so as to maintain hydrodynamic lubrication between the bearing journal and the bearing.

8. The method as set forth in claim 1, comprising turning the crankshaft via an electric motor powered by a battery.

9. A hybrid powertrain, comprising:
    an internal combustion engine comprising a crankshaft having a bearing journal and a bearing in which the bearing journal is turnable, the crankshaft being turned by the internal combustion engine when the internal combustion engine is operated in a fueled mode;
    an alternate drive arranged to operate when the internal combustion engine is in a non-fueled mode, the alternate drive comprising an electric motor-generator, the hybrid powertrain being operable to switch from a fueled mode during which the internal combustion engine operates and turns the crankshaft, to a non-fueled mode during which the internal combustion engine ceases operation during which the electric motor-generator operates, and back to the fueled mode; and
    means for constantly turning the crankshaft during an entire time that the internal combustion engine is in the non-fueled mode and not operated, the constant turning means comprising a mechanical connection to the electric motor-generator.

10. The hybrid powertrain as set forth in claim 9, comprising a battery for powering the electric motor-generator.

11. The hybrid powertrain as set forth in claim 9, comprising an oil pump arranged to lubricate the bearing journal and the bearing.

12. The hybrid powertrain as set forth in claim 11, comprising means for driving the oil pump while the internal combustion engine is in the non-fueled mode.

13. The hybrid powertrain as set forth in claim 12, wherein the driving means comprises a mechanical connection between the oil pump and the crankshaft such that rotation of the crankshaft drives the oil pump.

14. The hybrid powertrain as set forth in claim 12, wherein the driving means comprises an electrical drive.

15. The hybrid powertrain as set forth in claim 12, wherein the crankshaft is rotated and the oil pump is driven so as to maintain hydrodynamic lubrication between the bearing journal and the bearing.

\* \* \* \* \*